United States Patent [19]

Zummer

[11] 4,391,545

[45] Jul. 5, 1983

[54] RELEASABLE LOCKING CONNECTOR

[75] Inventor: Anthony S. Zummer, Kenilworth, Ill.

[73] Assignee: Metaport Corporation, Mass.

[21] Appl. No.: 117,252

[22] Filed: Jan. 31, 1980

[51] Int. Cl.³ .............................................. F16B 7/00
[52] U.S. Cl. .................................... 403/189; 403/246; 403/329
[58] Field of Search ............... 403/245, 246, 329, 330, 403/189, 187; 292/352

[56] References Cited

U.S. PATENT DOCUMENTS

| 2,739,006 | 3/1956 | Fisler | 292/352 |
| 3,091,490 | 5/1963 | Williams | 403/329 X |
| 3,603,628 | 7/1969 | Smith | 403/329 |

Primary Examiner—Andrew V. Kundrat

[57] ABSTRACT

This invention relates to an improved releasable locking connector particularly adapted for use in connection with a display apparatus. The connector includes an elongated base which has one end adapted to be secured to a member of a display apparatus and the other end of the base is free. The base has a catch aperture formed on the base adjacent to the free end. A stop is formed in the base adjacent to the end adapted to be secured to a member of a display apparatus. A holding strap is formed integral with the base between the stop and the catch aperture. A catch is mounted on the base. The catch includes a resilient flat beam having one end positioned in engagement with the stop and being positioned between the strap and the base. The catch has a dog formed integral with the end of the beam opposite to the end abutting the stop. The distance from the edge of the beam abutting the stop to the dog is substantially equal to the distance from the stop to the catch aperture. A tubular display member mateably receives the base. The tubular display member has a locking aperture positioned a distance from the free end of the tubular display member equal to the distance between the end of the base adapted to be secured to a member of a display apparatus and the catch aperture in the base. The tubular display member slidably receives the base and engages the dog to depress the dog until the dog enters the lock aperture when the free end of the tubular display member is positioned in abutment with the member of a display apparatus to which the base is secured.

6 Claims, 4 Drawing Figures

RELEASABLE LOCKING CONNECTOR

BACKGROUND OF THE INVENTION

In retail merchandising, a merchant often finds that it is desirable to utilize a display apparatus to show certain merchandise. As the merchandise changes with style and season, the merchant finds that it is desirable to change the arrangement of the display apparatus. A common and well known method of changing the apparatus is simply to take the apparatus apart and put it together in another selected fashion. To this end, the display apparatus often has connectors which lock the parts together, but which connectors may be quickly and readily released so that the apparatus may be taken apart with a minimum of tools. One of such connectors is disclosed in U.S. Pat. No. 3,603,628 to Smith et al. entitled Frame Connector Structure. The Smith et al device has many desirable features. However, the device has problems in view of the fact that both ends of the connector must be locked into place. In addition, it is difficult to be able to make any adjustment in the operation of the connector.

SUMMARY OF THE INVENTION

The present invention relates to an improved construction of a releasable locking connector which is particularly adapted for use in a display apparatus. The connector includes an elongated base which has one end adapted to be secured to a member of a display apparatus. The other end of the base is free for receiving a tubular display member. The base includes a catch aperture formed therein adjacent to the free end of the base. A stop is formed integral with the base and is a stamped-out portion of the base. The stop is positioned adjacent to the end of the base which is adapted to be secured to a member of a display apparatus. A holding strap is also a stamped-out portion of the base positioned between the stop and the catch aperture in an aligned arrangement. A catch is mounted on the base and held in position by the stop, holding strap and catch aperture.

The catch includes a flat resilient beam which has one end in abutment with the stop. A portion of the beam is positioned between the strap and the remainder of the base. A dog is formed integral with the end of the beam opposite to that abutting the stop. The dog is positioned in the catch aperture and extends out beyond the base to engage the tubular display member. The distance from the edge of the beam abutting the stop to the surface of the dog spaced away from the stop is substantially equal to the distance from the stop to the edge of the catch aperture spaced away from the stop.

The tubular display member slidably and mateably engages the base. The tubular display member has a lock aperture positioned a distance from its free end equal to the distance from the end of the base adapted to be secured to the member of a display apparatus and the catch aperture in the base. The tubular display member receives the base and depresses the dog against the resilience of the base to allow the tubular display member to receive mateably the base. When the tubular display member comes into abutment with the member of the display apparatus to which the base is secured, the resilience of the beam forces the dog into the lock aperture to lock the tubular display member to the base. The tubular display member is released from the base by depressing the dog in the lock aperture to allow the base to be withdrawn from the tubular display member. It is a principal object of this invention to provide an economical and simple releasable locking connector which may be easily assembled.

It is another object of the herein disclosed invention to provide an improved releasable locking connector which may be readily adjusted.

Other objects and uses of the present invention will become readily apparent to those skilled in the art upon perusal of the following specification in light of the accompanying drawing.

DESCRIPTION OF THE PREFERRED EMBODIMENT

Figure 1:
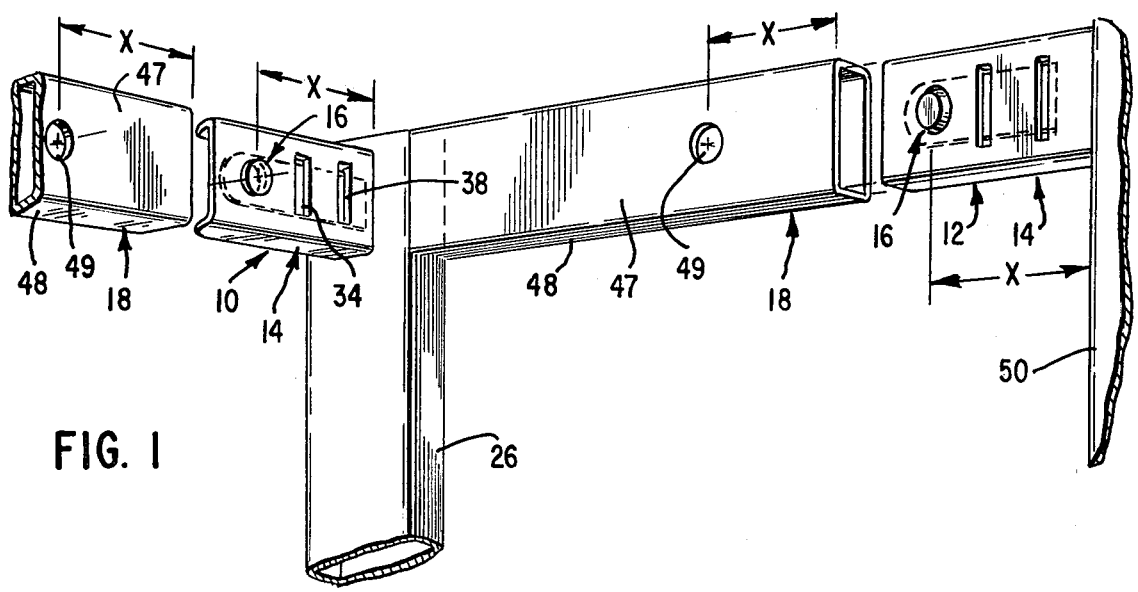
FIG. 1 is a perspective view showing a portion of a display apparatus showing two releasable locking connectors each identical in construction and each embodying the herein disclosed invention.
Figure 2:
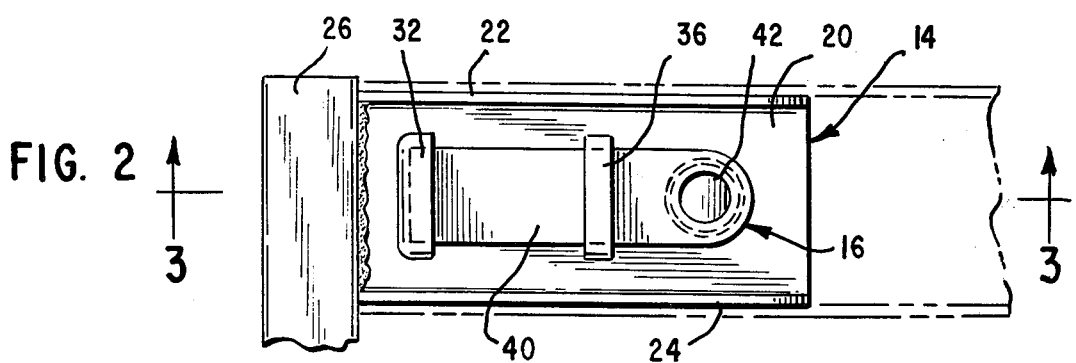
FIG. 2 is a cross-sectional view of a portion of releasable locking connector being an embodiment of the present invention showing a tubular display member in phantom view and showing a catch in plan view.

Referring now to the drawing, and especially to FIG. 1, identical releasable locking connectors 10 and 12 are shown therein in a released attitude. Each locking connector includes a base 14, a catch 16 mounted on the base, and a tubular display member 18, which is releasably lockable to its respective base by its respective catch 16.

Base 14 is generally U-shaped and includes a flat floor 20. The floor has a pair of parallel side walls 22 and 24 formed integral with opposed edges perpendicular to floor 20. The base has one end which is adapted to be secured to a member of a display apparatus, such as, upright 26, as shown in the drawing. The base is secured to the upright by welding, although any other convenient means of attachment may be used. The other end of the base is free and is adapted to receive tubular display member 18. Corners of side walls 22 and 24 are rounded to facilitate insertion of the base into the tubular display member. A circular catch aperture 28 is formed in floor 20 adjacent to the free end of the base. A stop 30 is formed in the floor adjacent to the end of the base opposite the free end, that is, the secured end of the base. A lip 32 is formed integral with stop 30. Stop 30 and lip 32 are stamped out of the floor 20 forming a stop slot 34. A holding strap 36 is also stamped out of the floor 20 leaving a strap slot 38. The strap 36 is positioned in line with the stop and catch aperture and is positioned closer to catch aperture 28 than to stop 30.

Catch 16 includes a flat resilient beam 40 with a dog 42 formed in one end of the beam. Beam 40 has a stop end 44 which is positioned in abutment with stop 30 and under lip 32. Beam 40 is also positioned under strap 36 for reasons which will become apparent hereinafter. Dog 42 is conical and is tapered from the beam outward. The dog has an inclined surface 46 so that the dog is in the form of a truncated cone. Inclined surface 46 is adapted for engagement with the tubular display member. Surface 46 slopes downward from the secured end of the base toward the free end so that when the tubular display member is placed into engagement with the dog as the tubular display member slidably receives receiver, the dog is depressed against the resilience of the beam.

Catch 16 is built to be received and held in base 14. The distance from the stop edge 44 to the edge of dog 42 is equal to the distance from stop 30 to the furthermost edge of catch aperture 28.

Base 14 may be simply and economically manufactured by simply stamping out the member to its desired shape and stamping the holding strap, stop and lip into floor 20. The catch is also simply and economically manufactured in view of the fact that the catch is also a stamped part. After the beam and the dog are stamped out of a single piece of metal, the catch is then heat treated to provide the necessary resilience to beam 40.

Tubular display member 18 is a standard rectangular piece of tubing, and base 14 is manufactured to size to allow the tubular base member to receive mateably the base. The width of the floor is slightly less than the maximum inside width of a face 47 of the rectangular tubular display member. The height of walls 22 and 24 is slightly less than the interior of an edge wall 48 of tubular display member 18. The tubular display member has a lock aperture 49 formed in face 47. Lock aperture 49 is alignable with catch aperture 28 when the free end of the tubular display member is aligned with the secured end of the base. Lock aperture 49 has the same diameter as the aperture 28. The tubular display member has one end secured to a member of a display apparatus, such as, number 26 and the base is secured to a member, such as, member 50. The distance from the center of the lock aperture to the free end of its tubular display member is a given distance such as "X" shown in FIG. 1, and the distance from the center of the catch aperture to the secured end of its base is the same distance "X".

In order to attach the catch to the base, it is only necessary to slide the stop end of the catch under the holding strap and slide the strap end toward the stop until the stop end abuts stop 30. At the same time that the stop end is positioned under lip 32 and stop end 44 engages stop 30, dog 46, by virtue of its tapered construction readily falls into catch aperture 28 and extends beyond floor 20 a distance substantially equal to the wall thickness of tubular display member 18. The connector is thereby in an attitude for locking the tubular display member to the base.

Figure 3:
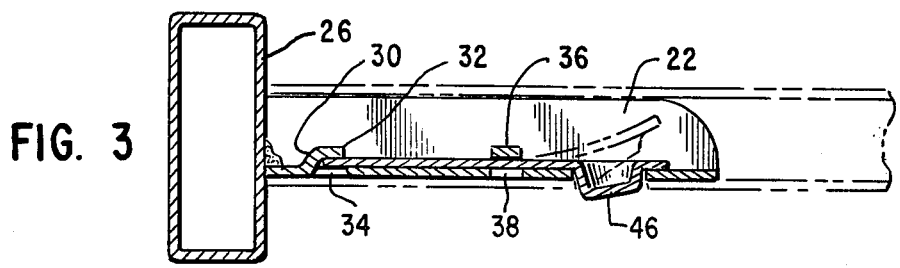
FIG. 3 is a cross-sectional view taken on line 3—3 of FIG. 2 showing a base and catch of the releasable locking connector and showing a portion of the catch in phantom view in a release position for release of a tubular display member.
Figure 4:
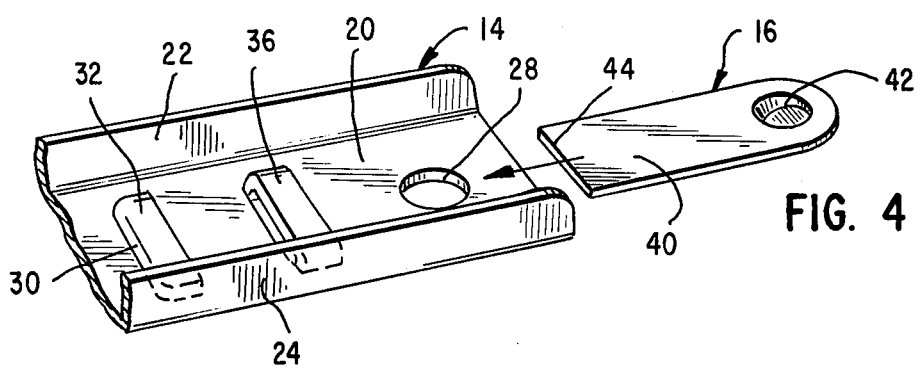
FIG. 4 is a perspective view showing a portion of a base of the locking connector and a catch which is adapted for mounting on the base.

The tubular display member mateably receives base 14. Tubular display member 18 receives the free edge of base 14 and the edge of the tubular display member engages inclined surface 46 of the dog so that the tubular display member rides over the dog to displace the dog against the resilient beam 40 to the attitude shown in dotted form in FIG. 3. The tubular display member then is moved toward the display member until the free end of tubular display member 18 comes into alignment with the secured end of the base and thereby adjacent to the upright. The resilience of the beam then forces the dog to enter into lock aperture 48. It may be seen that the side of the dog adjacent to the secured end is higher than that adjacent to the free end of the base so that the tubular display device is locked into place. The tubular display device may not move in one direction because the display member is in its way. It may not retract because the dog is positioned in lock aperture 48.

When it is necessary to release the tubular display member, it is a simple matter to depress dog 46 and to slide the tubular display member over the dog which allows the tubular display member to be disassembled from the base. It may be appreciated that in the event that an operator finds that the dog is difficult to depress, the operator may make an adjustment in the resilient beam simply by inserting a screwdriver, or other instrument, between the beam and the floor to give the beam a permanent set so that the dog may be more easily displaced. On the other hand, if it is necessary to increase the resilient force of the beam, the catch may be readily removed simply by pressing on the dog and moving the beam out from under the lip and then sliding the beam out from under the strap. The beam may then be bent to a permanent set so that there is a greater bow to the beam. When the catch is reinserted into the base, there is a greater resilient force urging the dog outward from the base.

Although a specific construction has been shown and described in detail herein, it is readily apparent that those skilled in the art may make various modifications and changes without departing from the spirit and scope of the present invention. It is to be expressly understood that the instant invention is limited only by the appended claims.

What is claimed is:

1. A releasable locking connector for use in a display apparatus comprising: an elongated base having one end adapted to be secured to a member of a display apparatus and the opposite end being free, a catch aperture formed in said base, a stop on said base, and a holding strap on said base positioned between the stop and the catch aperture; a catch mounted on said base, said catch having a dog movably mounted in said catch aperture and extendable through said catch aperture out beyond the surface of the base, a resilient beam having said dog mounted on one end, said beam having the other end in abutment with the stop and a portion between the base and the strap to hold the beam in position, the distance from the edge of the beam abutting the stop to the surface of the dog spaced away from the stop being substantially equal to the distance from the stop to the edge of the catch aperture spaced away from the stop, said stop including a holding lip for engagement with the resilient beam; and a tubular display member mateably receiving the base, said tubular display member having a lock aperture positioned a distance from a free end of the tubular display member equal to the distance between the end of the base adapted to be secured to a member of a display apparatus and the catch aperture in the base, and being alignable with the catch aperture to receive lockably the dog, whereby alignment of the one end of the base secured to a member of a display apparatus with the free end of the tubular display member allows the dog to enter the lock aperture to lock releasably the tubular display member to the base.

2. A releasable locking connector for use in a display apparatus comprising: an elongated base having one end adapted to be secured to a member of a display apparatus and the opposite end being free, a catch aperture formed in said base, a stop on said base, and a holding strap on said base positioned between the stop and the catch aperture; a catch mounted on said base, said catch having a dog movably mounted in said catch aperture and extendable through said catch aperture out beyond the surface of the base, a resilient beam having said dog mounted on one end, said beam having the other end in abutment with the stop and a portion between the base and the strap to hold the beam in position, the distance from the edge of the beam abutting the stop to the surface of the dog spaced away from the stop being substantially equal to the distance from the stop to the edge of the catch aperture spaced away from the stop, a holding lip formed integral with the stop for engagement with one end of the resilient beam, said stop, holding lip and strap being stamped out integral portions of said base; and a tubular display member mateably receiving the base, said tubular display member having a lock aperture positioned a distance from a free end of the tubular display member equal to the distance between the end of the base adapted to be secured to a member of a display apparatus and the catch aperture in the base, and being alignable with the catch aperture to receive lockably the dog, whereby alignment of the one end of the base secured to a member of a display apparatus with the free end of the tubular display member allows the dog to enter the lock aperture to lock releasably the tubular display member to the base.

3. A releasable locking connector for use in a display apparatus comprising: an elongated base having one end adapted to be secured to a member of a display apparatus and the opposite end being free, a catch aperture formed in said base, a stop on said base, and a holding strap on said base positioned between the stop and the catch aperture; a catch mounted on said base, said catch having a dog movably mounted on said catch aperture and extendable through said catch aperture out beyond the surface of the base, a holding lip formed integral with the stop; said stop, holding lip and strap being stamped out integral portions of the base, said strap being positioned closer to the catch aperture than to the stop, a resilient beam having said dog mounted on one end, said beam having the other end in abutment with the stop and a portion between the base and the strap to hold the beam in position, the distance from the edge of the beam abutting the stop to the surface of the dog spaced away from the stop being substantially equal to the distance from the stop to the edge of the catch aperture spaced away from the stop; and a tubular display member mateably receiving the base, said tubular display member having a lock aperture positioned a distance from a free end of the tubular display member equal to the distance between the end of the base adapted to be secured to a member of a display apparatus and the catch aperture in the base, and being alignable with the catch aperture to receive lockably the dog, whereby alignment of one end of the base secured to a member of a display apparatus with the free end of the tubular display member allows the dog to enter the lock aperture to lock releasably the tubular display member to the base.

4. A releasable locking connector for use in a display apparatus comprising: an elongated base having one end adapted to be secured to a member of a display apparatus and the opposite end being free, the base is U-shaped, said base includes a floor and a pair of side walls formed integral with opposite edges of the floor, a catch aperture formed in said base, a stop on said base, and a holding strap on said base positioned between the stop and the catch aperture; a catch mounted on said base, said catch having a dog movably mounted in said catch aperture and extendable through said catch aperture out beyond the surface of the base, a resilient beam having said dog mounted on one end, said beam having the other end in abutment with the stop and a portion between the base and the strap to hold the beam in position, the distance from the edge of the beam abutting the stop to the surface of the dog spaced away from the stop being substantially equal to the distance from the stop to the edge of the catch aperture spaced away from the stop, a holding lip formed integral with the stop in engagement with the resilient beam, the stop, said holding lip and the strap being stamped out integral portions of the floor of the base and being positioned in line between the parallel side walls; and a tubular display member mateably receiving the base, said tubular display member having a lock aperture positioned a distance from a free end of the tubular display member equal to the distance between the end of the base adapted to be secured to a member of a display apparatus and the catch aperture in the base, and being alignable with the catch aperture to receive lockably the dog, and said tubular display member having a rectangular cross-section and mateably receiving the U-shaped base, whereby alignment of the one end of the base secured to a member of a display apparatus with the free end of the tubular display member allows the dog to enter the lock aperture to lock releasably the tubular display member to the base.

5. A releasable locking connector for use in a display apparatus comprising: a base having one end adapted to be secured to a member of a display apparatus and the other end being free, said base having a U-shaped cross-section including a floor forming the bottom of the U and a pair of parallel side walls formed integral with the opposed edges of the floor forming the upstanding arms of the U, a stop stamped out of the floor and being positioned between the parallel walls, a holding lip formed integral with the stop stamped out of the floor, a circular catch aperture formed in the floor adjacent to the free end of the base, and a holding strap formed integral with the base and being stamped out of the floor of the base, said strap being positioned between the stop and the catch aperture closer to the catch aperture than to the stop; a catch mounted on said base, said catch having an elongated resilient flat beam, one end of the said beam being positioned in abutment with the stop and between the lip and floor, said beam having a portion between the strap and the floor, a dog having a circular cross-section formed integral with the end of the resilient beam opposite the end in abutment with the stop, said dog having an inclined surface on its upper portion sloping downward from the side of the dog adjacent to the end of the base adapted to be secured to a member of a display apparatus toward the side adjacent to the free end of the base, said dog being movably mounted in the catch aperture to move within the catch aperture, the dog having a height from the beam sufficiently great to extend beyond the surface of the base, the distance from the edge of the beam abutting the stop to the surface of the dog spaced away from the stop being substantially equal to the distance from the stop to the edge of the catch aperture spaced away from the stop; and a tubular display member having a rectangular cross-section mateably receiving the base and the catch, said tubular display member having a lock aperture positioned in one side a distance from the free end of the tubular display member equal to the distance from the end of the base adapted to be secured to a member of the display apparatus to the catch aperture in the base, said lock aperture being alignable with the catch aperture, whereby movement of the tubular display member coaxially along the base allows the interior of the tubular display member to engage the inclined surface of the dog to depress the dog against the resilience of the resilient beam and to allow the tubular display member to move into abutment with the member of a display apparatus and thereby allow the dog to enter the lock aperture in the tubular display apparatus and lock releasably the tubular display member to the base.

6. A releasable locking connector for use in a frame apparatus comprising: an elongated base having one end adapted to be secured to a member of a frame apparatus and the opposite end being free, a catch aperture formed in said base, a stop on said base, and a holding strap on said base positioned between the stop and the catch aperture; a catch mounted on said base, said catch having a dog movably mounted in said catch aperture and extendable through said catch aperture out beyond the surface of the base, a resilient beam having said dog mounted on one end, said beam having the other end in abutment with the stop and a portion between the base and the strap to hold the beam in position, the distance from the edge of the beam abutting the stop to the surface of the dog spaced away from the stop being substantially equal to the distance from the stop to the edge of the catch aperture spaced away from the stop, said stop including a holding lip for engagement with the resilient beam; and a tubular frame member mateably receiving the base, said tubular frame member having a lock aperture positioned a distance from a free end of the tubular frame member equal to the distance between the end of the base adapted to be secured to a member of a frame apparatus and the catch aperture in the base, and being alignable with the catch aperture to receive lockably the dog, whereby alignment of the one end of the base secured to a member of a frame apparatus with the free end of the tubular frame member allows the dog to enter the lock aperture to lock releasably the tubular frame member to the base.

* * * * *

UNITED STATES PATENT OFFICE
CERTIFICATE OF CORRECTION

PATENT NO. : 4,391,545
DATED : July 5, 1983
INVENTOR(S) : Anthony S. Zummer

It is certified that error appears in the above-identified patent and that said Letters Patent are hereby corrected as shown below:

Col. 7, line 2, "coaxially", should be --axially--

Signed and Sealed this

Thirteenth Day of September 1983

[SEAL]

Attest:

GERALD J. MOSSINGHOFF

Attesting Officer

Commissioner of Patents and Trademarks